United States Patent
Fukui et al.

(10) Patent No.: US 6,940,532 B1
(45) Date of Patent: Sep. 6, 2005

(54) INFORMATION PROCESSING APPARATUS, DISPLAY CONTROL METHOD AND STORAGE MEDIUM

(75) Inventors: Nobuhito Fukui, Inagi (JP); Yoshihiro Matsubara, Ishikawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/435,642

(22) Filed: Nov. 9, 1999

(30) Foreign Application Priority Data

Apr. 2, 1999 (JP) ............................................ 11-096182

(51) Int. Cl.[7] .............................................. G09G 5/00
(52) U.S. Cl. ..................................................... 345/784
(58) Field of Search .................................. 715/784, 785, 715/786, 787; 345/738, 762, 775, 778, 781, 784, 785, 786, 788, 790, 792, 794, 797, 651

(56) References Cited

U.S. PATENT DOCUMENTS

| | | | | |
|---|---|---|---|---|
| 5,210,689 A | * | 5/1993 | Baker et al. ..................... 704/1 |
| 5,499,334 A | * | 3/1996 | Staab .......................... 345/778 |
| 5,651,107 A | * | 7/1997 | Frank et al. .................. 345/768 |
| 5,745,100 A | * | 4/1998 | Bates et al. .................. 345/157 |
| 5,864,330 A | * | 1/1999 | Haynes ......................... 345/856 |
| 5,874,958 A | * | 2/1999 | Ludolph ....................... 345/781 |
| 6,182,046 B1 | * | 1/2001 | Ortega et al. ................ 704/275 |
| 6,184,879 B1 | * | 2/2001 | Minemura et al. ........... 345/723 |
| 6,215,490 B1 | * | 4/2001 | Kaply ........................... 345/788 |
| 6,215,491 B1 | * | 4/2001 | Gould ........................... 345/660 |
| 6,229,542 B1 | * | 5/2001 | Miller .......................... 345/782 |
| 6,307,547 B1 | * | 10/2001 | Bolnick ....................... 345/775 |
| 6,330,009 B1 | * | 12/2001 | Murasaki et al. ............ 345/784 |
| 6,330,316 B1 | * | 12/2001 | Donak et al. ................ 370/236 |
| 6,366,302 B1 | * | 4/2002 | Crosby et al. ............... 345/786 |
| 6,369,942 B1 | * | 4/2002 | Hedrick et al. ............. 359/430 |
| 6,441,837 B1 | * | 8/2002 | Harding et al. ............. 345/856 |
| 6,453,281 B1 | * | 9/2002 | Walters et al. .............. 704/200 |
| 6,466,237 B1 | * | 10/2002 | Miyao et al. ................ 345/838 |
| 2001/0043235 A1 | * | 11/2001 | Best et al. ................... 345/781 |

FOREIGN PATENT DOCUMENTS

| | | |
|---|---|---|
| JP | 62-100860 | 5/1987 |
| JP | 9-305368 | 11/1997 |

OTHER PUBLICATIONS

"Repulsive Pointer Grab", Apr. 1, 1994, IBM Technical Disclosure Bulleting, pp. 91–94.*

Robert Cowart, Windows 3.1 Special Edition, Sybex, 1993, pp. 4–42.*

* cited by examiner

Primary Examiner—Kristine Kincaid
Assistant Examiner—Thanh Vu
(74) Attorney, Agent, or Firm—Staas & Halsey LLP

(57) ABSTRACT

An information processing apparatus includes a scrolling section which changes a display on a display screen from a first display region to a second display region by a scrolling process, and a return section which returns the display to the first display region in response to a cancellation of the scrolling process by the scrolling section.

21 Claims, 8 Drawing Sheets

INFORMATION PROCESSING APPARATUS, DISPLAY CONTROL METHOD AND STORAGE MEDIUM

BACKGROUND OF THE INVENTION

1. Field of the Invention

The present invention generally relates to information processing apparatuses, display control methods and storage mediums, and more particularly to an information processing apparatus having a scroll function for scrolling contents displayed on a screen when creating, referring to and editing a document or an image, a display control method which carries out a scroll process with respect to the displayed contents on the screen, and a computer-readable storage medium which stores a program for causing a computer to carry out the scroll process with respect to the displayed contents on the screen.

2. Description of the Related Art

In information processing apparatuses typified by personal computers, document creating and/or editing apparatuses, image creating and/or editing apparatuses, and document and/or image referring apparatuses such as a World Wide Web (WWW) browser, a scrolling function is frequently used to advance or reverse information to a desired position when creating and/or editing documents or images. For example, when a user is viewing a certain page displayed on a screen when editing a document, the scrolling function can be used to refer to a page which precedes the certain page by several pages. The direction, speed and quantity of the scrolling function can be controlled, for example, by clicking and dragging a button which is displayed on the screen by a pointing device such as a mouse.

However, according to the conventional information processing apparatus, when the user uses the scrolling function when viewing a certain page displayed on the screen so as to refer to another page, the user must use the scrolling function again in order to return to the certain page. In other words, the user must search for the certain page using the scrolling function, and return to the certain page manually. As a result, there were problems in that it is necessary to carry out a troublesome operation of manually returning to the certain page, and it takes times to return to the certain page.

Furthermore, in a case where the user refer to several pages before returning to the original page, the user may forget the position of the original page. Hence, in a worst case, there was a problem in that the user may not be able to return to the original page.

The problems described above occur when carrying out a process within a single window. However, similar problems also occur in a multi-window system which is capable of simultaneously displaying a plurality of windows. For example, when the user is carrying out a process in a certain window and makes a reference to another window during the process, the user must also use the scrolling function in order to return to the certain window. In other words, in the conventional information processing apparatus, the user must use the scrolling function similarly as described above to manually switch the window and return to the certain window.

SUMMARY OF THE INVENTION

Accordingly, it is a general object of the present invention to provide a novel and useful information processing apparatus, display control method and storage medium, in which the problems described above are eliminated.

Another and more specific object of the present invention is to provide an information processing apparatus, a display control method and a storage medium, which can eliminate the problems described above by automatically returning a display made on a screen to an original position before a scrolling function is used to create, refer to and/or edit a document and/or an image.

Still another object of the present invention is to provide an information processing apparatus comprising a scrolling section which changes a display on a display screen from a first display region to a second display region by a scrolling process, and a return section which returns the display to the first display region in response to a cancellation of the scrolling process by the scrolling section. According to the information processing apparatus of the present invention, it is possible to automatically return the image display to an original position before a scroll function is used, after using the scroll function when creating, referring to and/or editing a document and/or an image. Hence, the efficiency of the such creating, referring and editing operations is greatly improved.

A further object of the present invention is to provide a display control method for controlling display of information on a display screen, comprising the steps of (a) changing a display on a display screen from a first display region to a second display region by a scrolling process, and (b) returning the display to the first display region in response to a cancellation of the scrolling process. According to the display control method of the present invention, it is possible to automatically return the image display to an original position before a scroll function is used, after using the scroll function when creating, referring to and/or editing a document and/or an image. Hence, the efficiency of the such creating, referring and editing operations is greatly improved.

Another object of the present invention is to provide a computer-readable storage medium which stores a program for causing a computer to control display of information on a display screen, where the program comprising the steps of (a) changing a display on a display screen from a first display region to a second display region by a scrolling process, and (b) returning the display to the first display region in response to a cancellation of the scrolling process. According to the computer-readable storage medium of the present invention, it is possible to automatically return the image display to an original position before a scroll function is used, after using the scroll function when creating, referring to and/or editing a document and/or an image. Hence, the efficiency of the such creating, referring and editing operations is greatly improved.

Other objects and further features of the present invention will be apparent from the following detailed description when read in conjunction with the accompanying drawings.

DESCRIPTION OF THE PREFERRED EMBODIMENTS

Figure 1:
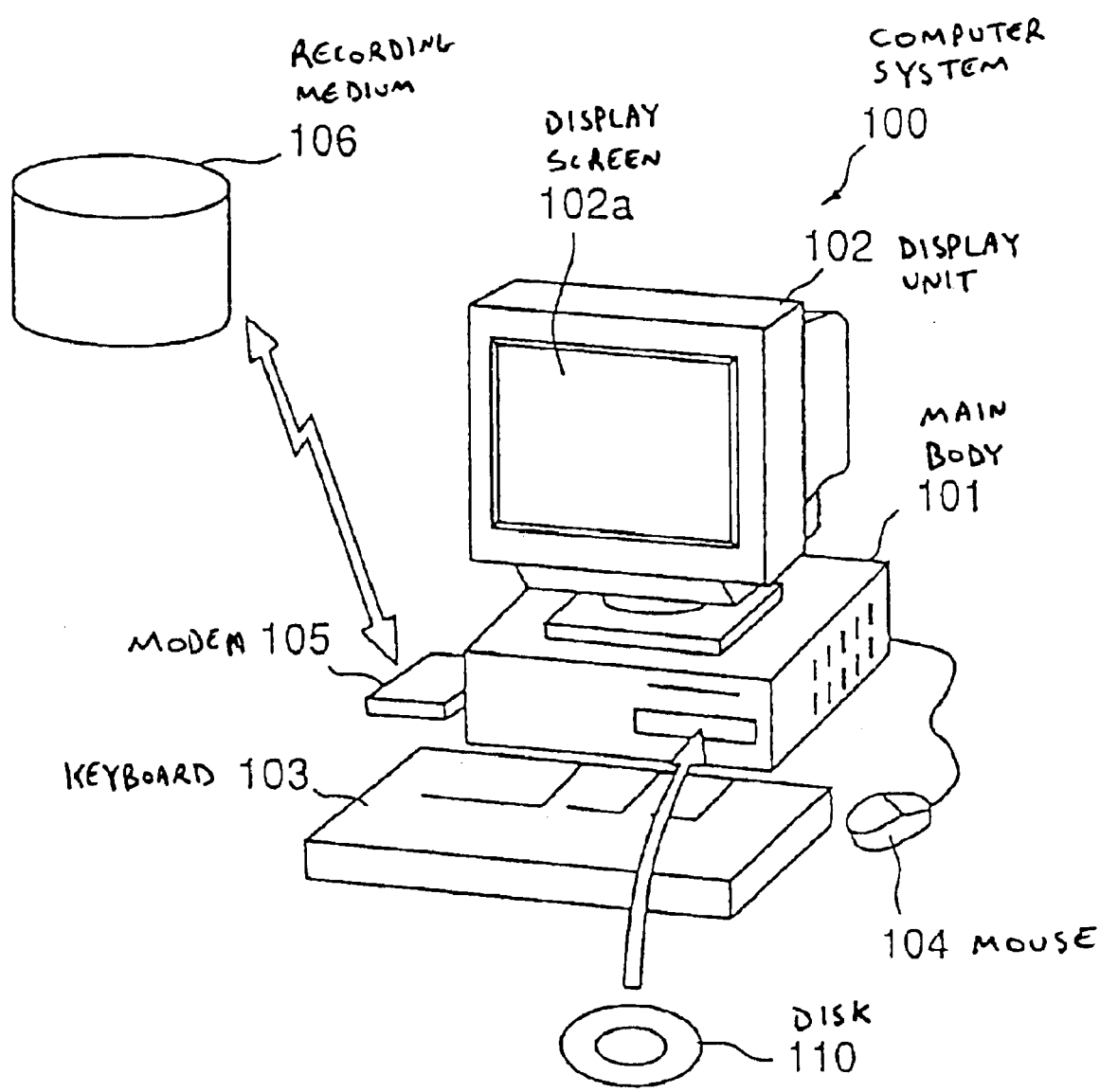
FIG. 1 is a perspective view showing a first embodiment of an information processing apparatus according to the present invention.

FIG. 1 is a perspective view showing a first embodiment of an information processing apparatus according to the present invention. This first embodiment of the information processing apparatus employs a first embodiment of a display control method according to the present invention, and a first embodiment of a storage medium according to the present invention. In this first embodiment, the information processing apparatus is formed by a general-purpose computer system such as a personal computer.

A computer system 100 shown in FIG. 1 includes a main body 101 which includes a CPU, a disk drive unit and the like, a display unit 102 which displays an image on a display screen 102a in response to an instruction from the main body 101, a keyboard 103 which is used to input various information to the computer system 100, a mouse 104 which is used to specify an arbitrary position on the display screen 102a, and a modem 105 which makes access to an external database or the like and downloads a program or the like stored in another computer system. One or more programs are stored in a portable recording medium such as a disk 110 or, are downloaded from a recording medium 106 of another computer system using a communication unit such as the modem 105, and are input to the computer system 100 and installed. The programs include a program for causing the CPU of the computer system 100 to carry out a process which will be described later in conjunction with FIG. 3, for example, in this first embodiment of the information processing apparatus.

The first embodiment of the storage medium according to the present invention stores at least the program for causing the CPU of the computer system 100 to carry out the process which will be described later in conjunction with FIG. 3, for example. The storage medium may be formed by a portable recording medium such as the disk 110 or, any other type of recording medium capable of storing one or more programs. For example, the recording medium usable as the storage medium includes semiconductor memory devices such as RAMs and ROMs, disks such as magnetic, optical and magneto-optical disks, CD-ROMS, IC memory cards, and recording mediums accessible by a computer system which is coupled via a communication unit or a communication means such as a modem and a LAN. The storage medium is not limited to a portable recording medium.

Figure 2:
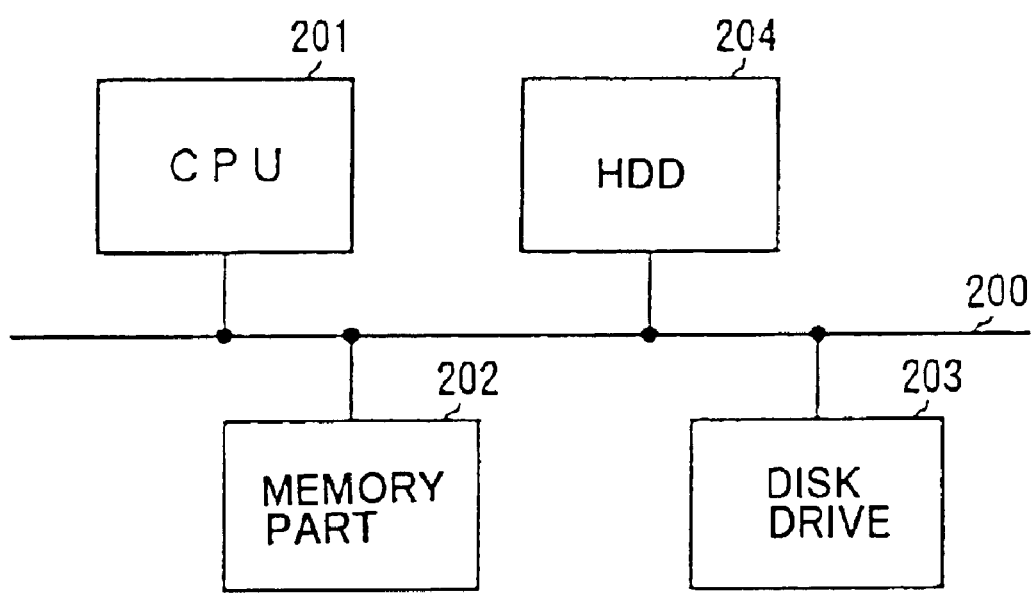
FIG. 2 is a system block diagram showing the construction of an important part within a main body of a computer system shown in FIG. 1.

FIG. 2 is a system block diagram showing an important part of the main body 101. The main body 101 shown in FIG. 2 includes a CPU 201 which carries out the process which will be described later in conjunction with FIG. 3, for example, a memory part 202 which is made up of a RAM. ROM or the like, a disk drive 203 which is capable of reading information from and writing information to the disk 110, and a hard disk drive 204 which are coupled via a bus 200. Although not shown in FIG. 2, the display unit 102, the keyboard 103, the mouse 103 and the like are also coupled to the CPU 201.

Of course, the construction of the computer system 100 is not limited to that shown in FIGS. 1 and 2, and various other known constructions may be used instead.

Figure 3:
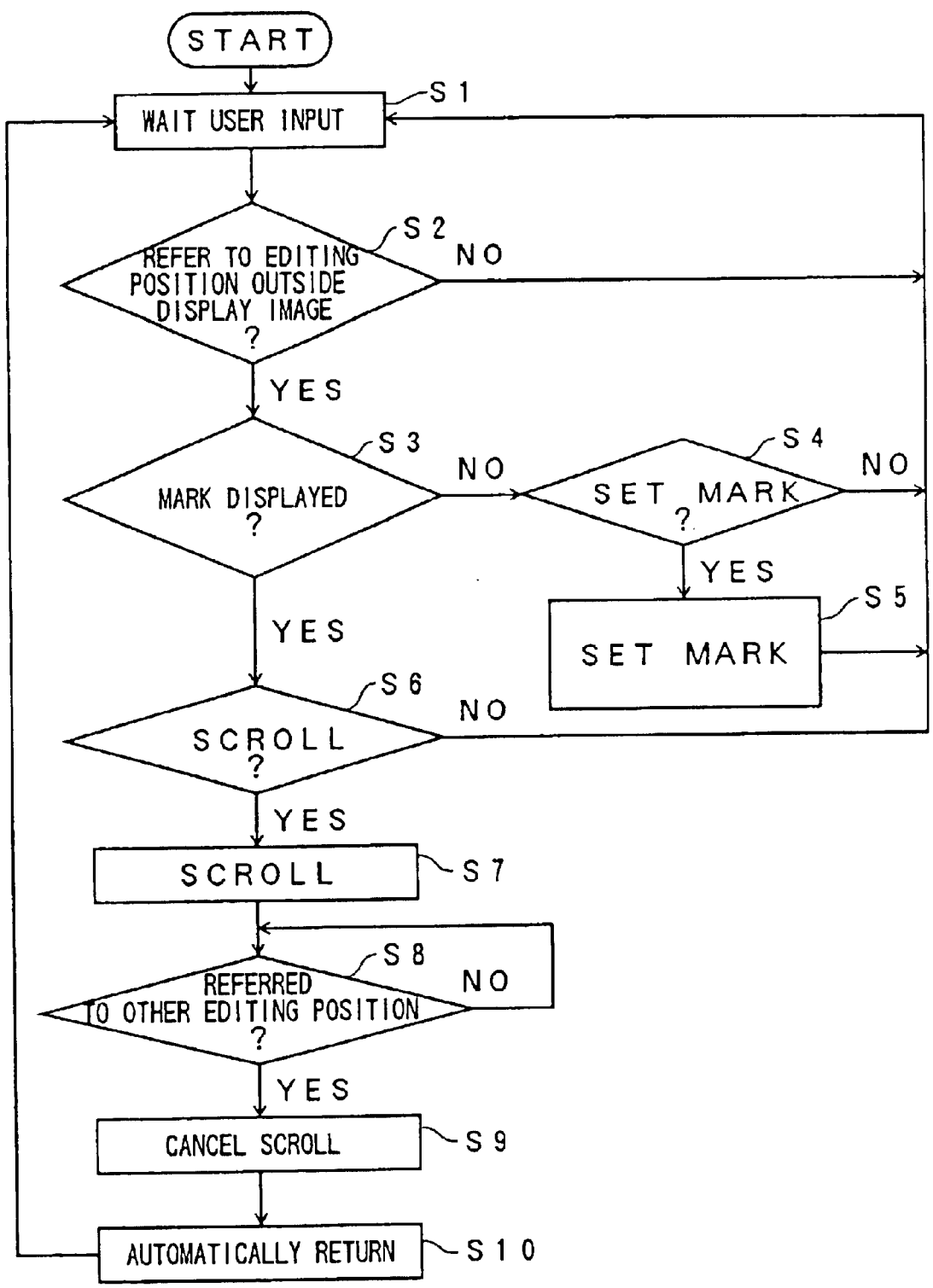
FIG. 3 is a flow chart for explaining the operation of a CPU in the first embodiment.

FIG. 3 is a flow chart for explaining the operation of the CPU 201 in the first embodiment. In FIG. 3, a step S1 waits for a user input from the keyboard 103 or the mouse 104, and the process advances to a step S2 when the user input is detected. In a state where the process advances to the step S2, a display image shown in FIG. 4, for example, is displayed on the display screen 102a of the display unit 102. In the following description, the "display image" refers to the contents displayed on the display screen 102a of the display unit 102, and not to the display screen 102a itself.

Figure 4:
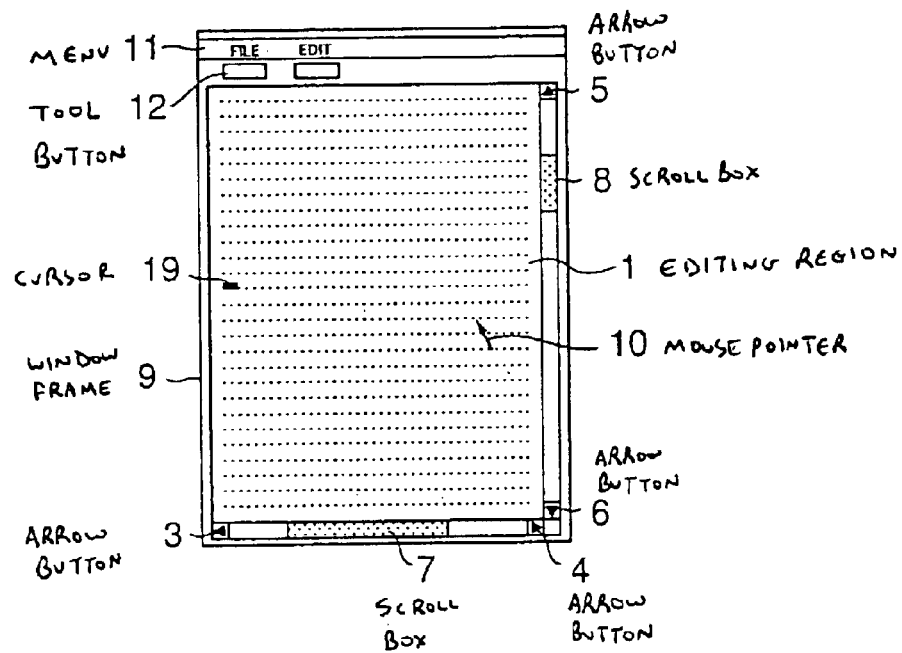
FIG. 4 is a diagram showing a display image for explaining the operation of the CPU in the first embodiment.

In FIG. 4, the display image includes an editing region (client region) 1, a leftwardly pointing arrow button 3, a rightwardly pointing arrow button 4, an upwardly pointing arrow button 5, a downwardly pointing arrow button 6, a horizontal scroll box 7, a vertical scroll box 8, a window frame 9, a mouse pointer 10, a menu 11, a tool button 12, a cursor 19 and the like.

The step S2 decides whether or not to refer to an editing position outside the display image, from on a present editing position. The process returns to the step S1 if the decision result in the step S2 is NO. On the other hand, if the decision result in the step S2 is YES, a step S3 decides whether or not a mark 2 is displayed at the present editing position in the display image. If the decision result in the step S3 is NO, a step S4 decides whether or not the mark 2 is to be set in the display image. The process returns to the step S1 if the decision result in the step S4 is NO. If the decision result in the step S4 is YES, a step S5 sets the mark 2 at an arbitrary reference position in the display image by operating the menu 11 or the tool button 12 by the mouse 104 or, by making a key operation using function keys and the like of the keyboard 103. After the step S5 sets the mark 2 at the arbitrary reference position in the display image, the process returns to the step S1.

Figure 5:
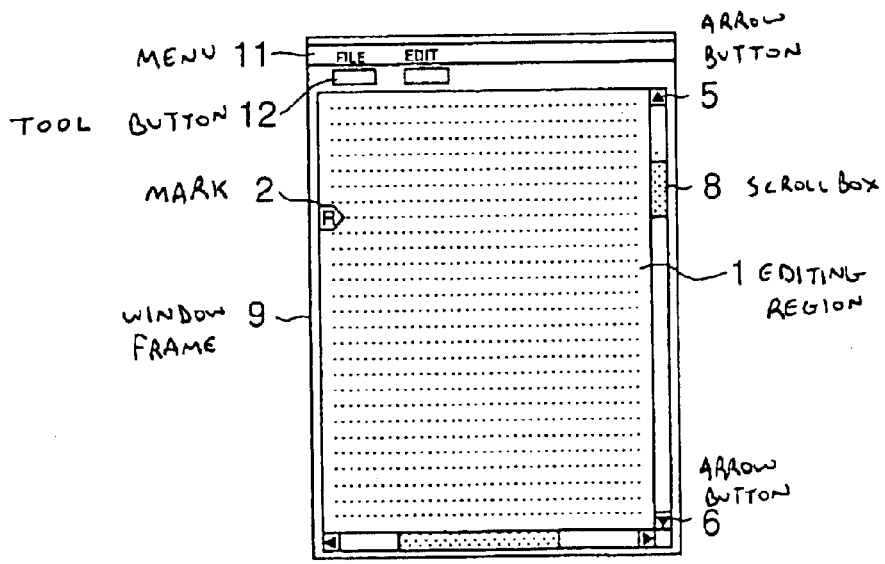
FIG. 5 is a diagram showing a display image for explaining the operation of the CPU in the first embodiment.

The mark 2 is set to the reference position where the user wishes to return to after the user carries out a scrolling process. For example, the mark 2 is set to the reference position shown in FIG. 5. FIG. 5 is a diagram showing a state where the mark 2 is set in the display image. In FIG. 5, those parts which are the same as those corresponding parts in FIG. 4 are designated by the same reference numerals, and a description thereof will be omitted. Of course, the mark 2 may be set manually or automatically to the present position of the cursor 19 which indicates the present editing position. In addition, the mark 2 may be set at a top position of the display image.

Figure 6:
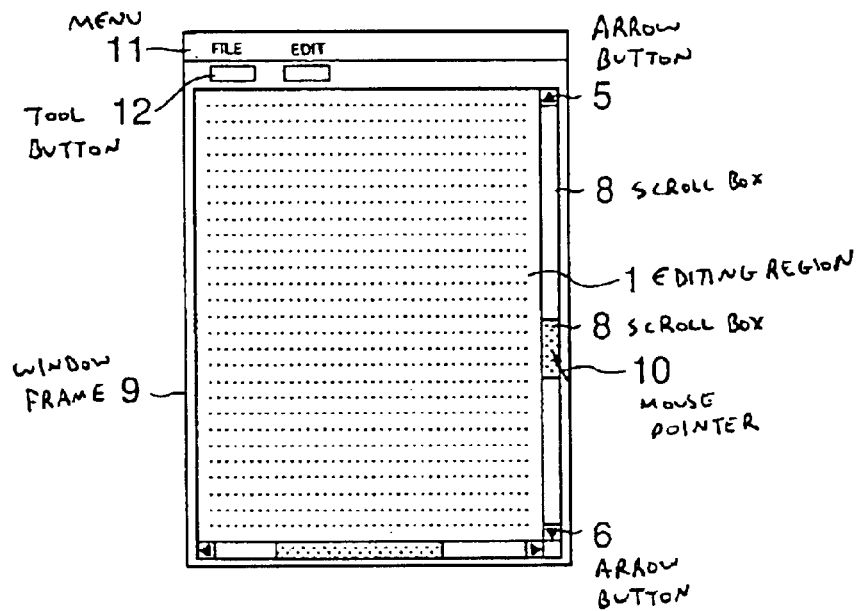
FIG. 6 is a diagram showing a display image for explaining the operation of the CPU in the first embodiment.

If the decision result in the step S3 is YES, a step S6 decides whether or not the scrolling process is to be carried out. The process returns to the step S1 if the decision result in the step S6 is NO. If the decision result in the step S6 is YES, a step S7 carries out the scrolling process. The scrolling process itself is known, and the scrolling process is not limited to a specific type of scrolling process. For example, an upward scroll may be made by moving the mouse pointer 10 onto the vertical scroll box 8 and carrying out a dragging process in the direction of the upwardly pointing arrow button 5 or, by moving the mouse pointer 10 onto the upwardly pointing arrow button 5 and continuously clocking the mouse 104. Similarly, a downward scroll may be made by moving the mouse pointer 10 onto the vertical scroll box 8 and carrying out a dragging process in the direction of the downwardly pointing arrow button 6 or, by moving the mouse pointer 10 onto the downwardly pointing arrow button 6 and continuously clocking the mouse 104. In addition, the scrolling process may be made by operating scroll keys of the keyboard 103. When the scrolling process is carried out, the display image assumes a state shown in FIG. 6, for example. FIG. 6 is a diagram showing a state where the downward scroll is made in the state shown in FIG. 5. In FIG. 6, those parts which are the same as those corresponding parts in FIG. 4 are designated by the same reference numerals, and a description thereof will be omitted.

During the scrolling process, the edited characters and images which are newly displayed move in the scrolling direction, while at the same time, the mark 2 and the edited characters and images which were displayed before the scrolling process move in a direction opposite to the scrolling direction. Accordingly, when the downward scroll is made as shown in FIG. 6, the mark 2 moves in the same direction as an upward scroll.

A step S8 decides whether or not a reference is made to an editing position other than the present editing position by the scrolling process. The process returns to the step S7 if the decision result in the step S8 is NO. On the other hand, if the decision result in the step S8 is YES, a step S9 carries out a scroll cancel process. The scroll cancel process itself is also known. For example, the scroll cancel process may be made by releasing the mouse button during the dragging process or, releasing the scroll key. In this embodiment, it is assumed for the sake of convenience that a dragging process is made with respect to the vertical scroll box 8 up to the position shown in FIG. 6.

Figure 7:
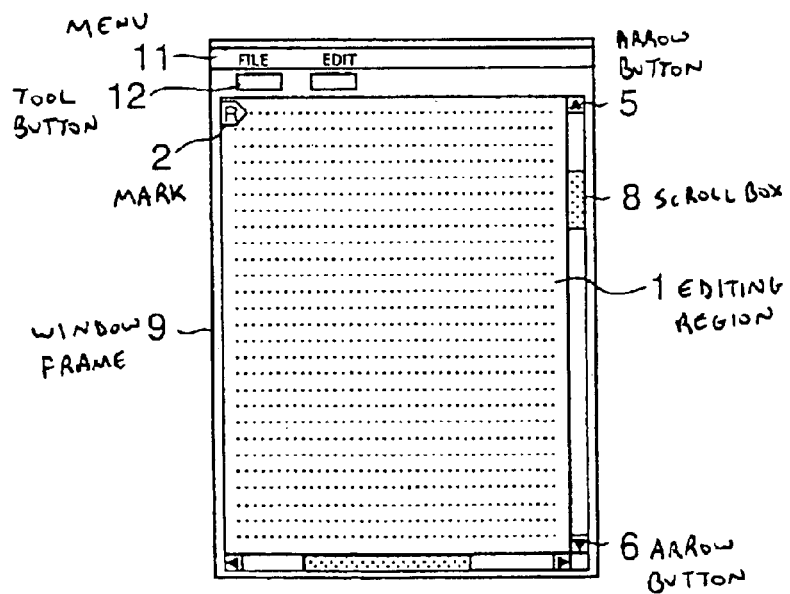
FIG. 7 is a diagram showing a display image for explaining the operation of the CPU in the first embodiment.

A step S10 automatically returns the editing position to a position so that the mark 2 is located at an uppermost end position within the window frame 9, for example. When the editing position is automatically returned, the vertical scroll box 8 and the like are also returned to positions corresponding to the reference position of the mark 2. As a result, the display image is returned to the editing position shown in FIG. 7. FIG. 7 is a diagram showing a state where the downward scroll is cancelled in the state shown in FIG. 6. In FIG. 7, those parts which are the same as those corresponding parts in FIG. 4 are designated by the same reference numerals, and a description thereof will be omitted.

When returning the editing position back to the original editing position, the mark 2 may be automatically returned to a position other than the uppermost end position or, may be returned to the reference position shown in FIG. 5. All that is required when returning the editing position back to the original editing position is that the editing position is automatically returned to a position near the original editing position where the mark 2 is displayed, and it is not essential for the editing position after the return to perfectly match the original editing position.

Next, a description will be given of a second embodiment of the information processing apparatus according to the present invention. This second embodiment of the information processing apparatus employs a second embodiment of the display control method according to the present invention, and a second embodiment of the storage medium according to the present invention. In this second embodiment, the information processing apparatus is also formed by a general-purpose computer system such as a personal computer. The basic construction of the hardware of this second embodiment of the information processing apparatus may be the same as the hardware construction described above in conjunction with FIGS. 1 and 2, and the illustration and description of the basic construction of the hardware of this second embodiment will be omitted.

Figure 8:
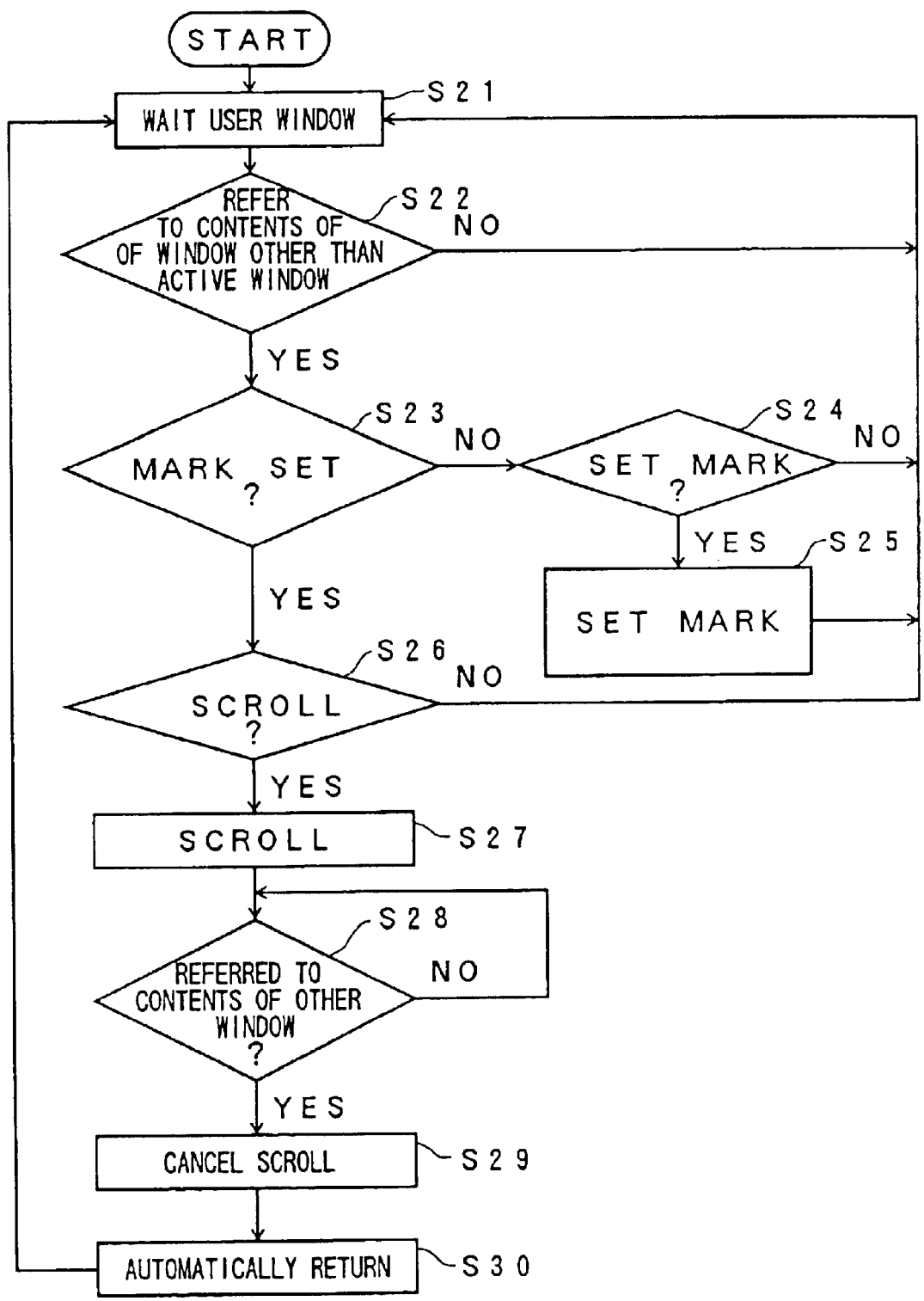
FIG. 8 is a flow chart for explaining the operation of the CPU in a second embodiment of the information processing apparatus according to the present invention.

FIG. 8 is a flow chart for explaining the operation of the CPU 201 in the second embodiment. In FIG. 8, a step S21 waits for the user input from the keyboard 103 or the mouse 104, and the process advances to a step S22 when the user input is detected. In a state where the process advances to the step S22, a display image shown in FIG. 9, for example, is displayed on the display screen 102a of the display unit 102.

Figure 9:
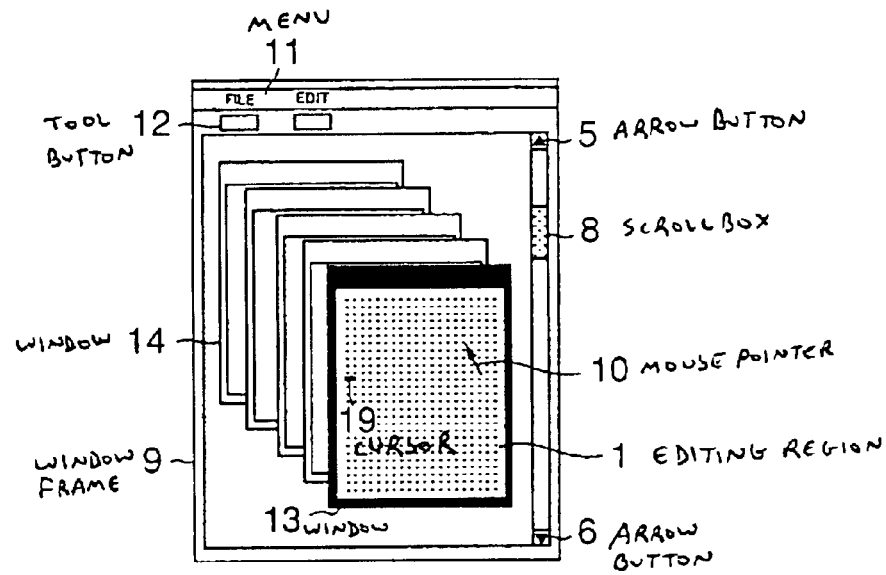
FIG. 9 is a diagram showing a display image for explaining the operation of the CPU in the second embodiment.

In FIG. 9, the display image includes an editing region (client region) 1, an upwardly pointing arrow button 5, a downwardly pointing arrow button 6, a vertical scroll box 8, a window frame 9, a mouse pointer 10, a menu 11, a tool button 12, a cursor 19, windows 13 and 14 and the like.

The step S22 decides whether or not to refer to a window at an editing position outside the display image, from a present active window at a present editing position. The process returns to the step S21 if the decision result in the step S22 is NO. For the sake of convenience, it is assumed that the present active window is the window 13 shown in FIG. 9, and that the window to be referred to is the window 14 shown in FIG. 9. On the other hand, if the decision result in the step S22 is YES, a step S23 decides whether or not a mark 2 is displayed in the present active window 13 in the display image. If the decision result in the step S23 is NO, a step S24 decides whether or not the mark 2 is to be set in the display image. The process returns to the step S21 if the decision result in the step S24 is NO. If the decision result in the step S24 is YES, a step S25 sets the mark 2 at an arbitrary reference position in the display image by operating the menu 11 or the tool button 12 by the mouse 104 or, by making a key operation using function keys and the like of the keyboard 103. After the step S25 sets the mark 2 at the arbitrary reference position in the display image, the process returns to the step S21. The arbitrary reference position in the display image corresponds to a position within an arbitrary window, and in this particular case, the arbitrary reference position is located within the active window 13.

Figure 10:
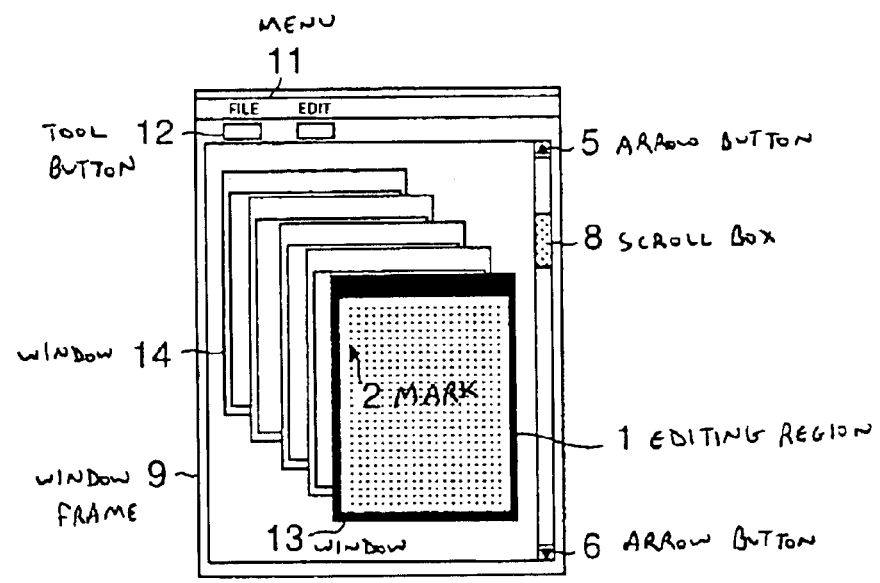
FIG. 10 is a diagram showing a display image for explaining the operation of the CPU in the second embodiment.

The mark 2 is set to the reference position within the window where the user wishes to return to after the user carries out a scrolling process. For example, the mark 2 is set to the reference position shown in FIG. 10. FIG. 10 is a diagram showing a state where the mark 2 is set in the display image. In FIG. 10, those parts which are the same as those corresponding parts in FIG. 9 are designated by the same reference numerals, and a description thereof will be omitted. Of course, the mark 2 may be set manually or automatically to the present position of the cursor 19 which indicates the present editing position within the active window 13. In addition, the mark 2 may be set at a top position of the display image, that is, at the top position of the active window 13.

If the decision result in the step S23 is YES, a step S26 decides whether or not the scrolling process is to be carried out. The process returns to the step S21 if the decision result in the step S26 is NO. If the decision result in the step S26 is YES, a step S27 carries out the scrolling process.

In this embodiment, the scrolling process refers to the following process. Generally, in the multi-window system such as that used in this embodiment, a priority sequence of the display of the windows is managed, and the overlapping display of the windows is controlled depending on the priority sequence. In other words, the window which is displayed at the frontmost position has the highest priority sequence.

By using this priority sequence information of the windows, a control is carried out to display a window having a priority sequence which is next lowest to that of the window which is presently displayed at the frontmost position, when the downward scroll is instructed. On the other hand, when the upward scroll is instructed, a control is carried out to display a window having a priority sequence which is next highest to that of the window which is presently displayed at the frontmost position.

In the normal switching of the windows, the priority sequence of the windows changes. However, during this scrolling process, the priority sequence information of the window at the time when the scroll process is started is held, and the held priority sequence information is used to switch the window which is displayed at the frontmost position.

Figure 11:
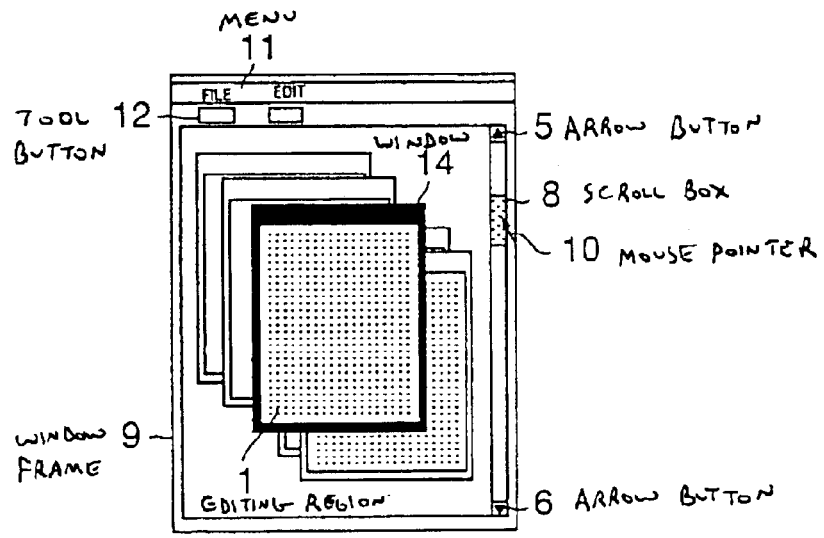
FIG. 11 is a diagram showing a display image for explaining the operation of the CPU in the second embodiment.

When the scrolling process described above is carried out, the display image assumes a state shown in FIG. 11, for example. FIG. 11 is a diagram showing a state where the upward scroll is made in the state shown in FIG. 10 until the window 14 active. In FIG. 11, those parts which are the same as those corresponding parts in FIG. 10 are designated by the same reference numerals, and a description thereof will be omitted.

A step S28 decides whether or not a reference is made to a window other than the present active window 13, that is, an editing position other than the present editing position, by the scrolling process. The process returns to the step S27 if the decision result in the step S28 is NO. On the other hand, if the decision result in the step S28 is YES, a step S29 carries out a scroll cancel process. The scroll cancel process itself is known, as described above. For example, the scroll cancel process may be made by releasing the mouse button during the dragging process or, releasing the scroll key. In this embodiment, it is assumed for the sake of convenience that a dragging process is made with respect to the vertical scroll box 8 up to the position shown in FIG. 11.

Figure 12:
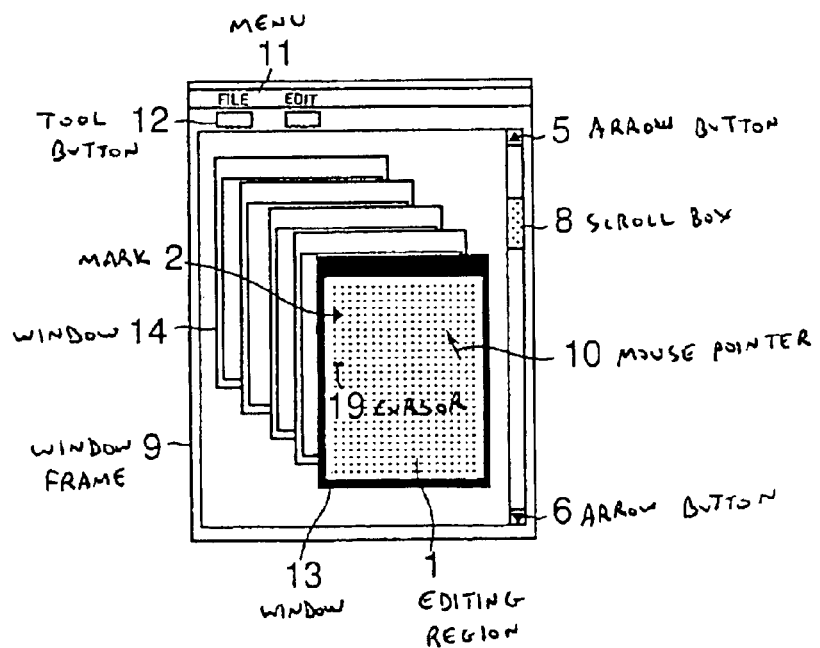
FIG. 12 is a diagram showing a display image for explaining the operation of the CPU in the second embodiment.

A step S30 automatically returns the editing position to a position so that the window 13 in which the mark 2 is displayed becomes active. That is, the editing position is automatically returned to the position where the window 13 is displayed at the frontmost position in the display image, depending on the priority sequence of the windows at the time when the scrolling process described above is started. When the editing position is automatically returned, the vertical scroll box 8 and the like are also returned to positions corresponding to the reference position of the mark 2. As a result, the display image is returned to the editing position shown in FIG. 12. FIG. 12 is a diagram showing a state where the downward scroll is cancelled in the state shown in FIG. 11. In FIG. 12, those parts which are the same as those corresponding parts in FIG. 9 are designated by the same reference numerals, and a description thereof will be omitted.

The second embodiment of the storage medium according to the present invention stores at least the program for causing the CPU 201 of the computer system 100 to carry out the process described above in conjunction with FIG. 8. The storage medium may be formed by a portable recording medium such as the disk 110 or, any other type of recording medium capable of storing one or more programs. For example, the recording medium usable as the storage medium includes semiconductor memory devices such as RAMs and ROMs, disks such as magnetic, optical and magneto-optical disks, CD-ROMs, IC memory cards, and recording mediums accessible by a computer system which is coupled via a communication unit or a communication means such as a modem and a LAN. The storage medium is not limited to a portable recording medium.

In each of the embodiments described above, the mark 2 which is once set may be deleted by an operation which reverses the operation carried out at the time when the mark 2 is set, if the mark 2 is no longer necessary. In addition, an internal timer of the CPU 201 may be utilized to automatically delete the mark 2 after a predetermined time elapses from the time when the mark 2 is set. The mark 2 may also be deleted automatically when a file is closed. Furthermore, when a new mark is set in a state where the mark 2 is already set at another position, it is also possible to automatically delete the mark 2 which is already set when the new mark is set.

Moreover, in each of the embodiments described above, when the region on the display screen 102a on which the display is made is changed from a first display region to a second display region and the display is to be returned to the first display region in response to the scroll cancel process, the second display region may of course include display contents other than those of the first display region or include display contents which partially include the display contents of the first display region.

The present invention is applied to the computer system such as the personal computer, in each of the embodiments described above. However, the present invention is similarly applicable to various kinds of information processing apparatuses, including document creating and/or editing apparatuses, image creating and/or editing apparatuses, document and/or image referring apparatuses such as a WWW browser, and work stations. In addition, the information processing apparatus is not limited to the desk-top type, and the present invention is of course applicable to portable type information processing apparatuses such as lap-top personal computers.

Further, the present invention is not limited to these embodiments, but various variations and modifications may be made without departing from the scope of the present invention.

What is claimed is:

1. An information processing apparatus comprising:
    a setting section configured to set a mark within a first display region of a display image displayed on a display unit;
    a scrolling section configured to change a display on the display unit, from the first display region of the display image to a second display region of the display image that is different from the first display region, by a scrolling process in response to a continuous, uninterrupted activation of an input device or key; and
    a return section configured to automatically return the display to said first display region in response to a cancellation of the scrolling process by said scrolling section so that the mark is visible in said first display that is displayed, wherein the cancellation corresponds to a release of the input device or key.

2. The information processing apparatus as claimed in claim 1, wherein both said first display region and said second display region are displayed within a single window which is displayed on the display screen.

3. The information processing apparatus as claimed in claim 1, wherein said first display region is formed by one window within a multi-window which includes a plurality of windows, and said second display region is formed by another window within said multi-window.

4. The information processing apparatus as claimed in claim 1, wherein said return section displays said first display region at a position where said mark is displayed on the display screen.

5. The information processing apparatus as claimed in claim 4, wherein said first display region is formed by a window within a multi-window which includes a plurality of windows, said second display region is formed by another window within said multi-window, and said return section displays said first display region at a position where said one window including the mark is displayed at a frontmost position on the display screen.

6. The information processing apparatus as claimed in claim 1, wherein said setting section sets the mark at a position of a cursor in said first display region.

7. The information processing apparatus of claim 1, further comprising:

a deleting section that deletes the mark.

8. A display control method for controlling display of information on a display screen, comprising:

setting a mark within a first display region of a display image displayed on a display unit;

changing a display on the display unit, from the first display region of the display image to a second display region of the display image is different from the first display region, by a scrolling process in response to a continuous, uninterrupted activation of an input device or key; and automatically returning the display to said first display region in response to a cancellation of the scrolling process so that the mark is visible in said first display that is displayed, wherein the cancellation corresponds to a release of the input device or key.

9. The display control method as claimed in claim 8, wherein both said first display region and said second display region are displayed within a single window which is displayed on the display screen.

10. The display control method as claimed in claim 8, wherein said first display region is formed by one window within a multi-window which includes a plurality of windows, and said second display region is formed by another window within said multi-window.

11. The display control method as claimed in claim 8, wherein said automatically returning displays said first display region at a position where said mark is displayed on the display screen.

12. The display control method as claimed in claim 11, wherein said first display region is formed by a window within a multi-window which includes a plurality of windows, said second display region is formed by another window within said multi-window, and said automatically returning displays said first display region at a position where said one window including the mark is displayed at a frontmost position on the display screen.

13. The display control methods as claimed in claim 8, wherein said setting sets the mark at a position of a cursor in said first display region.

14. The display control method of claim 8, further comprising:

deleting the mark.

15. A computer-readable storage medium that provides instructions controlling the display of information on a display screen, which, when executed by a machine, causes the machine to perform operations comprising:

setting a mark within a first display region of a display image displayed on a display unit;

changing a display on the display unit, from the first display region of the display image to a second display region of the display image that is different from the first display region, by a scrolling process in response to a continuous, uninterrupted activation of an input device or key; and automatically returning the display to said first display region in response to a cancellation of the scrolling process so that the mark is visible in said first display that is displayed, wherein the cancellation corresponds to a release of the input device or key.

16. The computer-readable storage medium as claimed in claim 15, wherein both said first display region and said second display region are displayed with a single widow which is displayed on the display screen.

17. The computer-readable storage medium as claimed in claim 15, wherein said first display region is formed by one window within a multi-window which includes a plurality of windows, and said second display region is formed by another window within said multi-window.

18. The computer-readable storage medium as claimed in claim 15, wherein said automatically returning displays said first display region at a position where said mark is displayed on the display screen.

19. The computer-readable storage medium as claimed in claim 18, wherein said first display region is formed by a window within a multi-window which includes a plurality of windows, said second display region is formed by another window within said multi-window, and said automatically returning displays said first display region at a position where said one window including the mark is displayed at a frontmost position on the display screen.

20. The computer-readable storage medium as claimed in claim 15, wherein said setting sets the mark at a position of a cursor in said first display region.

21. The computer-readable storage medium of claim 15, wherein the instructions cause the machine to perform operations further comprising:

deleting the mark.

* * * * *

UNITED STATES PATENT AND TRADEMARK OFFICE
CERTIFICATE OF CORRECTION

PATENT NO. : 6,940,532 B2
APPLICATION NO. : 09/435642
DATED : September 6, 2005
INVENTOR(S) : Nobuhito Fukui et al.

It is certified that error appears in the above-identified patent and that said Letters Patent is hereby corrected as shown below:

First Page, Column 1 (Inventors), Lines 1-2, delete "Yoshihiro Matsubara, Ishikawa (JP)".
Column 9, Line 31, after "image" insert - - that - -.
Column 10, Line 30, delete "with" and insert - - within - - therefor.
Column 10, Line 30, delete "widow" and insert - - window - - therefor.

Signed and Sealed this

Fifteenth Day of August, 2006

JON W. DUDAS
*Director of the United States Patent and Trademark Office*